US008880869B1

United States Patent
Shah et al.

(10) Patent No.: US 8,880,869 B1
(45) Date of Patent: Nov. 4, 2014

(54) SECURE WIRELESS LOCAL AREA NETWORK (WLAN) FOR DATA AND CONTROL TRAFFIC

(75) Inventors: Sandip Shah, Milpitas, CA (US); Jeffrey L Pochop, Jr., Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 498 days.

(21) Appl. No.: 12/951,497

(22) Filed: Nov. 22, 2010

(51) Int. Cl.
*H04L 29/06* (2006.01)
*H04L 9/32* (2006.01)

(52) U.S. Cl.
USPC ............ 713/151; 713/161; 713/171; 713/181

(58) Field of Classification Search
USPC ........................ 713/150–153; 726/2–3, 26–30
See application file for complete search history.

(56) References Cited

U.S. PATENT DOCUMENTS

| 2008/0115203 A1* | 5/2008 | Elzur ............................... 726/12 |
| 2008/0123652 A1* | 5/2008 | Akyol ............................ 370/392 |
| 2008/0126559 A1* | 5/2008 | Elzur et al. ..................... 709/232 |
| 2009/0276830 A1* | 11/2009 | O'Connor ......................... 726/3 |

OTHER PUBLICATIONS

B. Weis, Security considerations and proposal for MACsec key establishment, May 15, 2006.*

* cited by examiner

*Primary Examiner* — Kambiz Zand
*Assistant Examiner* — Trong Nguyen
(74) *Attorney, Agent, or Firm* — Harrity & Harrity, LLP

(57) ABSTRACT

A device receives capability information associated with a next hop device of a wireless local area network (WLAN). The device also determines, based on the capability information, whether the next hop device is capable of implementing security for traffic, where the security includes a media access control (MAC) security standard and a layer 2 link security standard. The device further creates, via the MAC security standard, a secure channel with the next hop device when the next hop device is capable of providing security for traffic.

20 Claims, 9 Drawing Sheets

SECURE WIRELESS LOCAL AREA NETWORK (WLAN) FOR DATA AND CONTROL TRAFFIC

BACKGROUND

A wireless local area network (WLAN) links two or more devices using some wireless distribution method, and usually provides a connection through an access point (AP) to other networks. A wireless access point (or access point) is a device that allows wired communication devices (e.g., network devices, such as routers, firewalls, switches, or gateways, which transfer or switch data, such as packets) to connect to a wireless network (e.g., a WLAN). The access point may relay data between wireless devices (e.g., client devices, such as personal computers, laptop computers, printers, smart phones, etc.) in the wireless network and another network. In one example, an access point may include a wireless network device, such as a wireless router.

A typical corporate use of access points involves attaching several access points to a wired network (e.g., a corporate intranet that includes one or more network devices) and providing wireless access to client devices located, for example, in a building. The access points may form a WLAN for the client devices, and may be managed by a WLAN controller. The WLAN controller may handle automatic adjustments to radio frequency (RF) power, channels, authentication, and/or security associated with the access points. The WLAN controller may communicate with an aggregation network (e.g., that includes an aggregation device), and the aggregation network may communicate with multiple access networks (e.g., that include access devices). The access points may communicate with one or more access networks.

Most current WLAN architectures are centralized, where the access points and the WLAN controller are deployed as an overlay over a wired network (e.g., a wired enterprise network). However, the centralized WLAN architecture is not scalable since all data traffic is communicated through the WLAN controller. A manually-deployed distributed WLAN architecture is one alternative to the centralized WLAN architecture. With the distributed WLAN architecture, control traffic may be tunneled to the WLAN controller, and data traffic may be tunneled to an access layer or an aggregation layer. However, creating such tunnels requires significant manual configuration overhead, especially for larger architectures.

The centralized and distributed WLAN architectures may need to provide secure control traffic between access points and the WLAN controller. Some centralized and distributed WLAN architectures may also need to establish secure data tunnels before data traffic can be forwarded. However, to implement end-to-end tunnel security between an access point and other WLAN devices (e.g., access devices, aggregation devices, etc.) requires providing enhanced forwarding chip hardware functionality, as well as a new board layout, in the access point and the other WLAN devices. Such hardware changes are both expensive and time consuming.

SUMMARY

According to one aspect, a method may be implemented by a computing device. The method may include receiving, by the computing device, capability information associated with a next hop device of a WLAN. The method may also include determining, by the computing device and based on the capability information, whether the next hop device is capable of implementing security for traffic, where the security includes a media access control (MAC) security standard and a layer 2 link security standard. The method may further include creating, by the computing device and via the MAC security standard, a secure channel with the next hop device when the next hop device is capable of providing security for traffic.

According to another aspect, a device may include a memory to store a plurality of instructions, and a processor to execute instructions in the memory to receive capability information associated with a next hop device of a WLAN. The processor may also execute instructions in the memory to determine, based on the capability information, whether the next hop device is capable of implementing security for traffic, where the security includes a MAC security standard and a layer 2 link security standard. The processor may further execute instructions in the memory to create, via the MAC security standard, a secure channel with the next hop device when the next hop device is capable of providing security for traffic.

According to still another aspect, one or more non-transitory computer-readable media may store instructions executable by one or more processors. The media may store one or more instructions for: receiving capability information associated with a next hop device of a WLAN; determining, based on the capability information, whether the next hop device is capable of implementing security for traffic, where the security includes a MAC security standard and a layer 2 link security standard; creating, via the MAC security standard, a secure channel with the next hop device when the next hop device is capable of providing security for traffic; receiving, via the secure channel, a key from the next hop device; receiving packet for forwarding to the next hop device; determining whether the packet is valid based on an integrity check; encrypting the packet with the key; forwarding the encrypted packet to the next hop device when the packet is valid; and handling the packet according to a preset policy when the packet is invalid.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Systems and/or methods described herein may provide a secure WLAN for data and control traffic. For example, the systems and/or methods may utilize a media access control (MAC) security standard (e.g., the MACSec standard set forth in IEEE 802.1ae) along with a layer 2 link security standard (e.g., the KeySec standard set forth in IEEE 802.1af) to provide a secure data tunnel from an access point to other WLAN devices (e.g., access devices, aggregation devices, etc.). The systems and/or methods may also utilize the MAC security standard and the layer 2 link security standard to provide a secure control tunnel from an access point to other WLAN devices. The systems and/or methods may be implemented in existing WLAN architectures, and may not require enhanced forwarding chips and new board layouts in the access point and the other WLAN devices.

In an example implementation, the systems and/or methods may receive capability information associated with a next hop device of a WLAN, and may determine, based on the capability information, if the next hop device is capable of providing security. If the next hop device is not capable of providing security (e.g., via the MAC and layer 2 link security standards), the systems and/or methods may select a different next hop device. If the next hop device is capable of providing security, the systems and/or methods may create a secure channel with the next hop device, and may exchange keys with the next hop device. The systems and/or methods may receive a packet for forwarding to the next hop device, and may determine if the packet is valid based on an integrity check. If the packet is valid, the systems and/or methods may encrypt the packet with a key received from the next hop device, and may forward the valid encrypted packet to the next hop device via the secure channel. If the packet is invalid, the systems and/or methods may handle the invalid packet according to a preset policy (e.g., may discard the invalid packet).

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

The term "tunnel," as used herein, is intended to be broadly construed to include a secure path through an untrusted network, a path that enables traffic (e.g., packets) to be provided over an incompatible delivery-network, etc.

Figure 1:
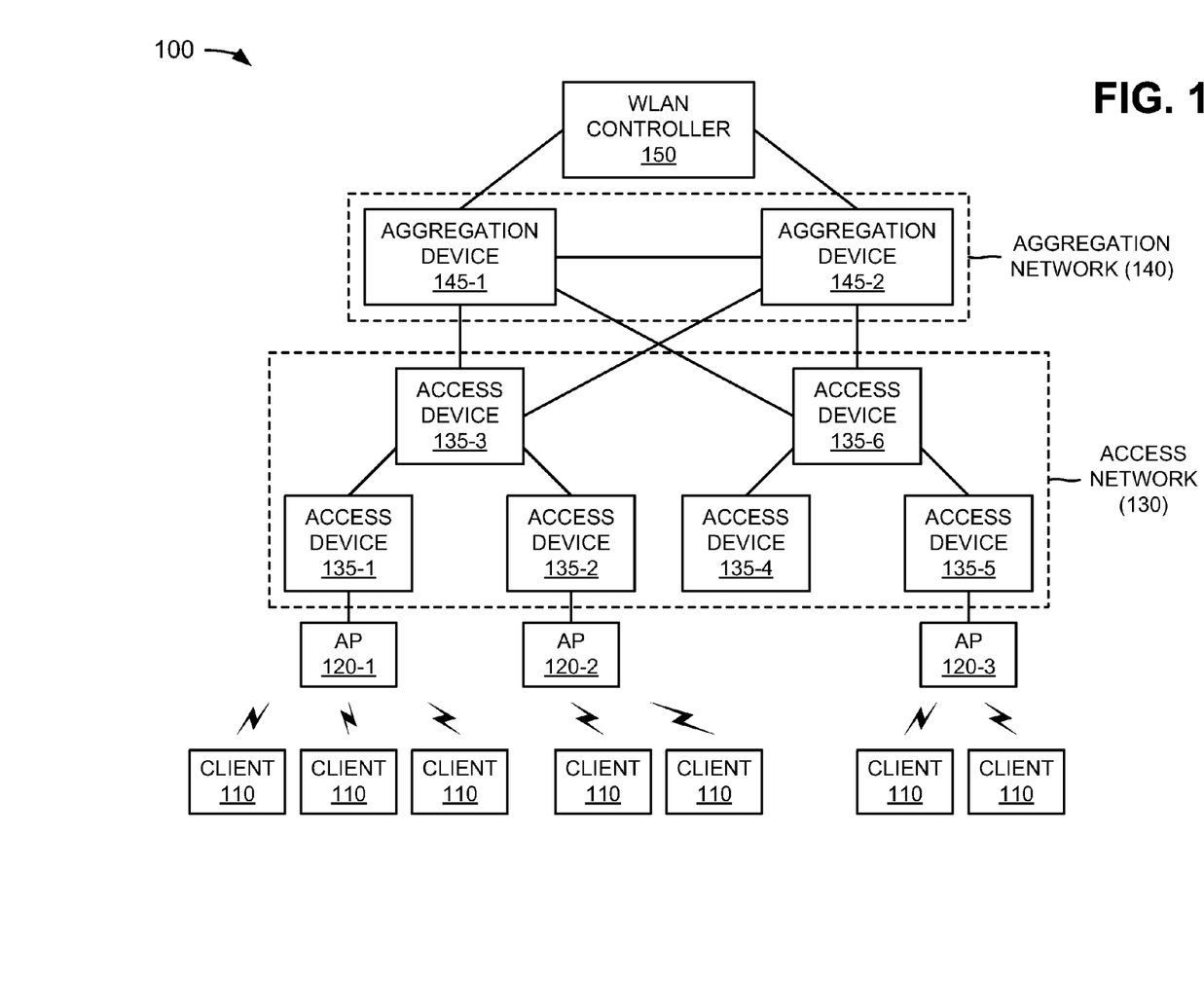
FIG. 1 is a diagram of an example network in which systems and/or methods described herein may be implemented.

FIG. 1 is a diagram of an example network 100 in which systems and/or methods described herein may be implemented. As illustrated, network 100 may include multiple client devices 110, multiple access points (APs) 120-1, 120-2, and 120-3 (collectively referred to herein as "access points 120," and singularly as "access point 120"), an access network 130, multiple access devices 135-1 through 135-6 (collectively referred to herein as "access devices 135," and singularly as "access device 135"), an aggregation network 140, multiple aggregation devices 145-1 and 145-1 (collectively referred to herein as "aggregation devices 145," and singularly as "aggregation device 145"), and a WLAN controller 150. In one example implementation, access points 120, access network 130, access devices 135, aggregation network 140, aggregation devices 145, and WLAN controller 150 may form a centralized or a distributed WLAN architecture for client devices 110.

Components of network 100 may interconnect via wired and/or wireless connections or links. Seven client devices 110, three access points 120, one access network 130, six access devices 135, one aggregation network 140, two aggregation devices 145, and one WLAN controller 150 have been illustrated in FIG. 1 for simplicity. In practice, there may be more client devices 110, access points 120, access networks 130, access devices 135, aggregation networks 140, aggregation devices 145, and/or WLAN controllers 150. Also, in some instances, one or more of the components of network 100 may perform one or more tasks described as being performed by another one or more of the components of network 100.

Client device 110 may include any device that is capable of accessing the WLAN network via one or more access points 120. For example, client device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a smart phone, a laptop computer, a personal computer, a printer, or other types of computation or communication devices.

Access point 120 may include a device that allows wired communication devices (e.g., access devices 135 and/or aggregation devices 145) to connect to a wireless network using wireless technologies (e.g., Wi-Fi, Bluetooth, or related standards). For example, access point 120 may connect to access device 135, and may communicate data between wireless devices (e.g., client devices 110) and access device 135. In one example, access point 120 may include a wireless network device, such as a wireless router. In one example implementation, one or more access points 120 may be provided in a particular area (e.g., a building) in order to provide client devices 110 with wireless access to additional networks (not shown).

Access network 130 may include one or more networks of any type. For example, access network 130 may include a LAN, a wide area network (WAN), a metropolitan area network (MAN), an intranet, or a combination of networks. In one example implementation, access network 130 may include a network that provides client devices 110 with wireless access (e.g., via access points 120) to additional networks (e.g., the Public Switched Telephone Network (PSTN), Public Land Mobile Network (PLMN), an intranet, the Internet, etc.).

Access device 135 may include a network device, such as a gateway, a router, a switch, a firewall, a network interface card (NIC), a hub, a bridge, a proxy server, an optical add-drop multiplexer (OADM), or some other type of device that processes and/or transfers traffic. In an example implementation, access device 135 may include a device that is capable of transmitting information to and/or receiving information from access points 120, aggregation network 140, and/or aggregation devices 145.

Aggregation network 140 may include one or more networks of any type. For example, aggregation network 140 may include a LAN, a WAN, a MAN, an intranet, or a combination of networks. In one example implementation, aggregation network 140 may include a network that provides client devices 110 with wireless access (e.g., via access points 120) to additional networks (e.g., the PSTN, PLMN, an intranet, the Internet, etc.).

Aggregation device 145 may include a network device, such as a gateway, a router, a switch, a firewall, a NIC, a hub, a bridge, a proxy server, an OADM, or some other type of device that processes and/or transfers traffic. In an example implementation, aggregation device 145 may include a device that is capable of transmitting information to and/or receiving information from access network 130, access devices 135, and/or WLAN controller 150. For example, aggregation device 145 may multiplex and/or demultiplex traffic between multiple access devices 135 and a link connecting aggregation device 145 to WLAN controller 150.

WLAN controller 150 may include one or more computation or communication devices, that gather, process, and/or provide information in a manner described herein. In one example, WLAN controller 150 may include a server device, a laptop computer, a personal computer, a workstation computer, etc. WLAN controller 150 may handle automatic adjustments to RF power, channels, authentication, and/or security associated with access points 120. WLAN controller 150 may communicate with aggregation device 145 via aggregation network 140.

In one example implementation, a particular WLAN device (e.g., one of access points 120, access devices 135, aggregation devices 145, or WLAN controller 150) may receive capability information associated with a next hop WLAN device, and may determine, based on the capability information, if the next hop device is capable of providing security. If the next hop device is not capable of providing security (e.g., via the MAC and layer 2 link security standards), the particular WLAN device may select a different next hop WLAN device. If the next hop device is capable of providing security, the particular WLAN device may create a secure channel with the next hop device, and may exchange keys with the next hop device. The particular WLAN device may receive a packet for forwarding to the next hop device, and may determine if the packet is valid based on an integrity check. If the packet is valid, the particular WLAN device may encrypt the packet with a key received from the next hop device, and may forward the valid encrypted packet to the next hop device via the secure channel. If the packet is invalid, the particular WLAN device may handle the invalid packet according to a preset policy (e.g., may discard the invalid packet).

Although FIG. 1 shows example components of network 100, in other implementations, network 100 may include fewer components, different components, differently arranged components, or additional components than depicted in FIG. 1.

Figure 2:
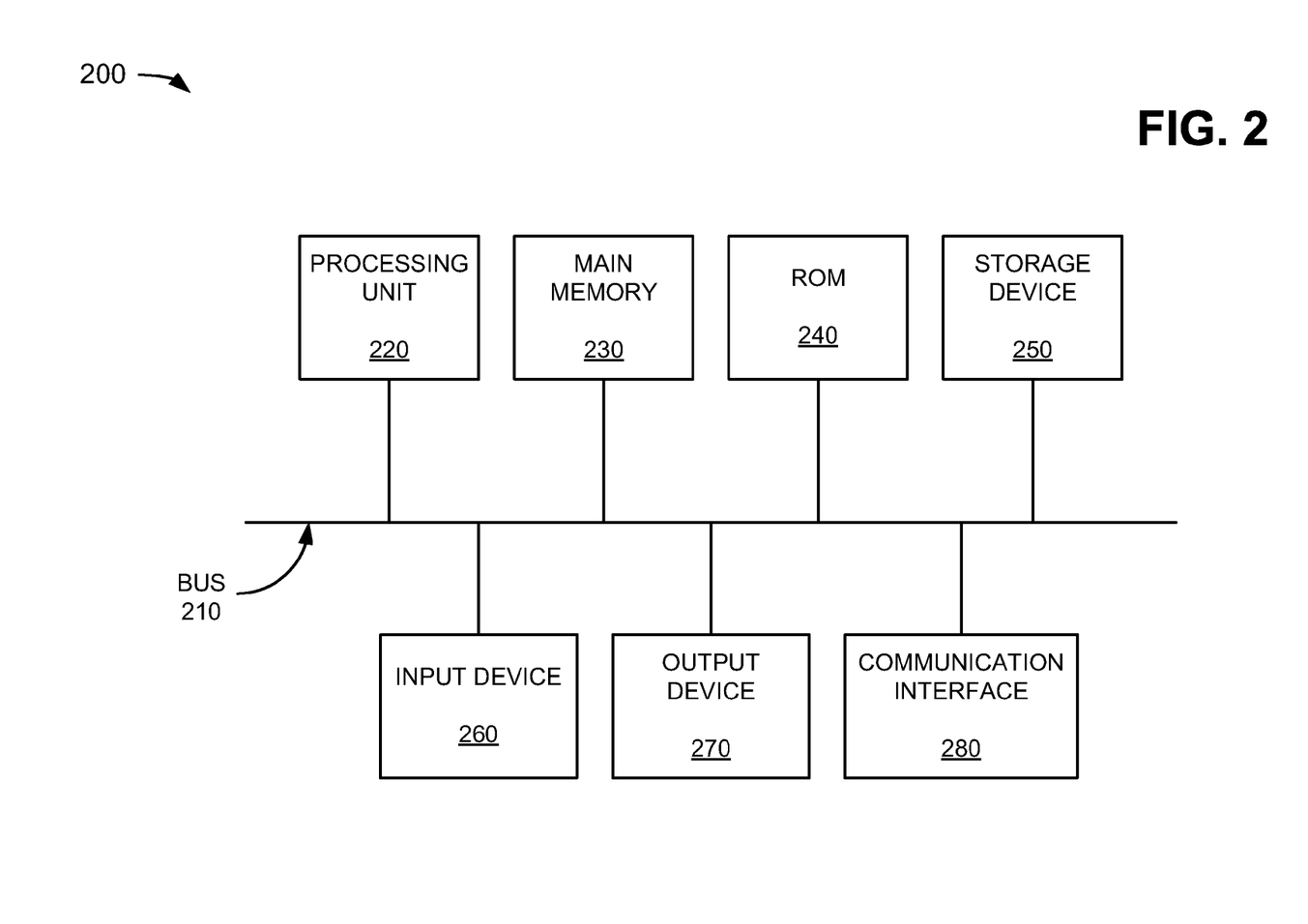
FIG. 2 is a diagram of example components of a WLAN controller depicted in FIG. 1.

FIG. 2 is a diagram of example components of a device 200 that may correspond to WLAN controller 150 (FIG. 1). As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, ASICs, FPGAs, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
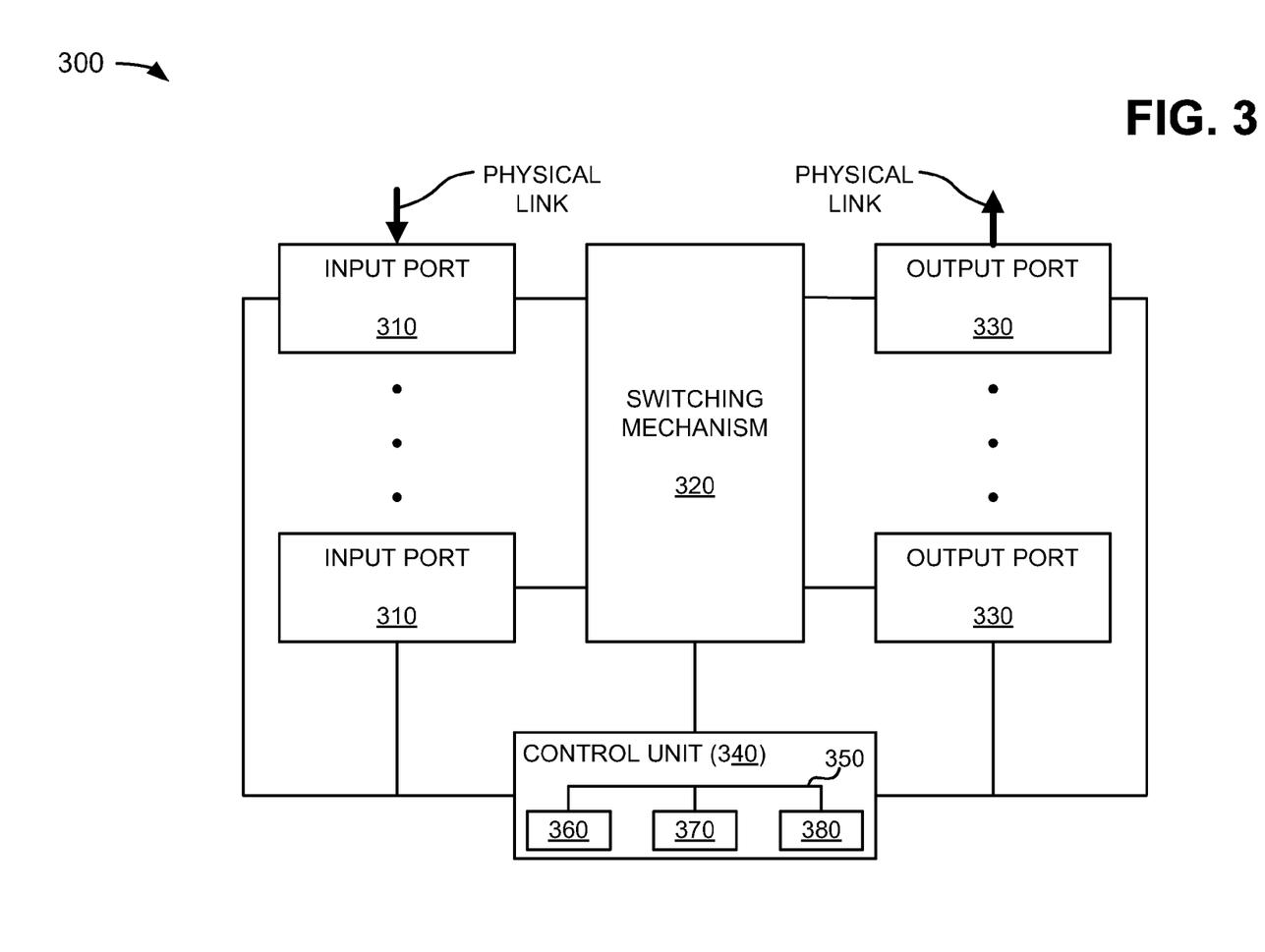
FIG. 3 is a diagram of example components of an access point, an access device, or an aggregation device depicted in FIG. 1.

FIG. 3 is a diagram of example components of a device 300 that may correspond to access point 120, access device 135, or aggregation device 145 (FIG. 1). In one implementation, device 300 may also correspond to WLAN controller 150 (FIG. 1). As shown, device 300 may include input ports 310, a switching mechanism 320, output ports 330, and a control unit 340.

Input ports 310 may be a point of attachment for physical links and may be a point of entry for incoming traffic (e.g., packets). Input ports 310 may carry out data link layer encapsulation and decapsulation. In example implementations, input ports 310 may send (e.g., may be an exit point) and/or receive (e.g., may be an entry point) packets.

Switching mechanism 320 may interconnect input ports 310 with output ports 330. Switching mechanism 320 may be implemented using many different techniques. For example, switching mechanism 320 may be implemented via busses, crossbars, and/or with shared memories (e.g., which may act as temporary buffers to store traffic from input ports 310 before the traffic is eventually scheduled for delivery to output ports 330).

Output ports 330 may store packets and may schedule packets for service on output links (e.g., physical links). Output ports 330 may include scheduling algorithms that support priorities and guarantees. Output ports 330 may support data link layer encapsulation and decapsulation, and/or a variety of higher-level protocols. In an example implementations, output ports 330 may send packets (e.g., may be an exit point) and/or receive packets (e.g., may be an entry point).

Control unit 340 may use routing protocols and one or more forwarding tables for forwarding packets. Control unit 340 may connect with input ports 310, switching mechanism 320, and output ports 330. Control unit 340 may compute a forwarding table, implement routing protocols, and/or run software to configure and manage device 300. Control unit 340 may handle any packet whose destination address may not be found in the forwarding table.

In an example implementation, control unit 340 may include a bus 350 that may include a path that permits communication among a processor 360, a memory 370, and a communication interface 380. Processor 360 may include one or more processors, microprocessors, ASICs, FPGAs, or other types of processing units that may interpret and execute instructions. Memory 370 may include a RAM, a ROM device, a magnetic and/or optical recording medium and its corresponding drive, and/or another type of static and/or dynamic storage device that may store information and instructions for execution by processor 360. Memory 370 may also temporarily store incoming traffic (e.g., a header of a packet or an entire packet) from input ports 310, for processing by processor 360, before a packet is directed back to the shared memories (e.g., in switching mechanism 320), queued in the shared memories (e.g., based on processing results), and eventually scheduled to be sent to output ports 330. Communication interface 380 may include any transceiver-like mechanism that enables control unit 340 to communicate with other devices and/or systems.

Device 300 may perform certain operations, as described herein. Device 300 may perform these operations in response to processor 360 executing software instructions contained in a computer-readable medium, such as memory 370. The software instructions may be read into memory 370 from another computer-readable medium, such as a data storage device, or from another device via communication interface 380. The software instructions contained in memory 370 may cause processor 360 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
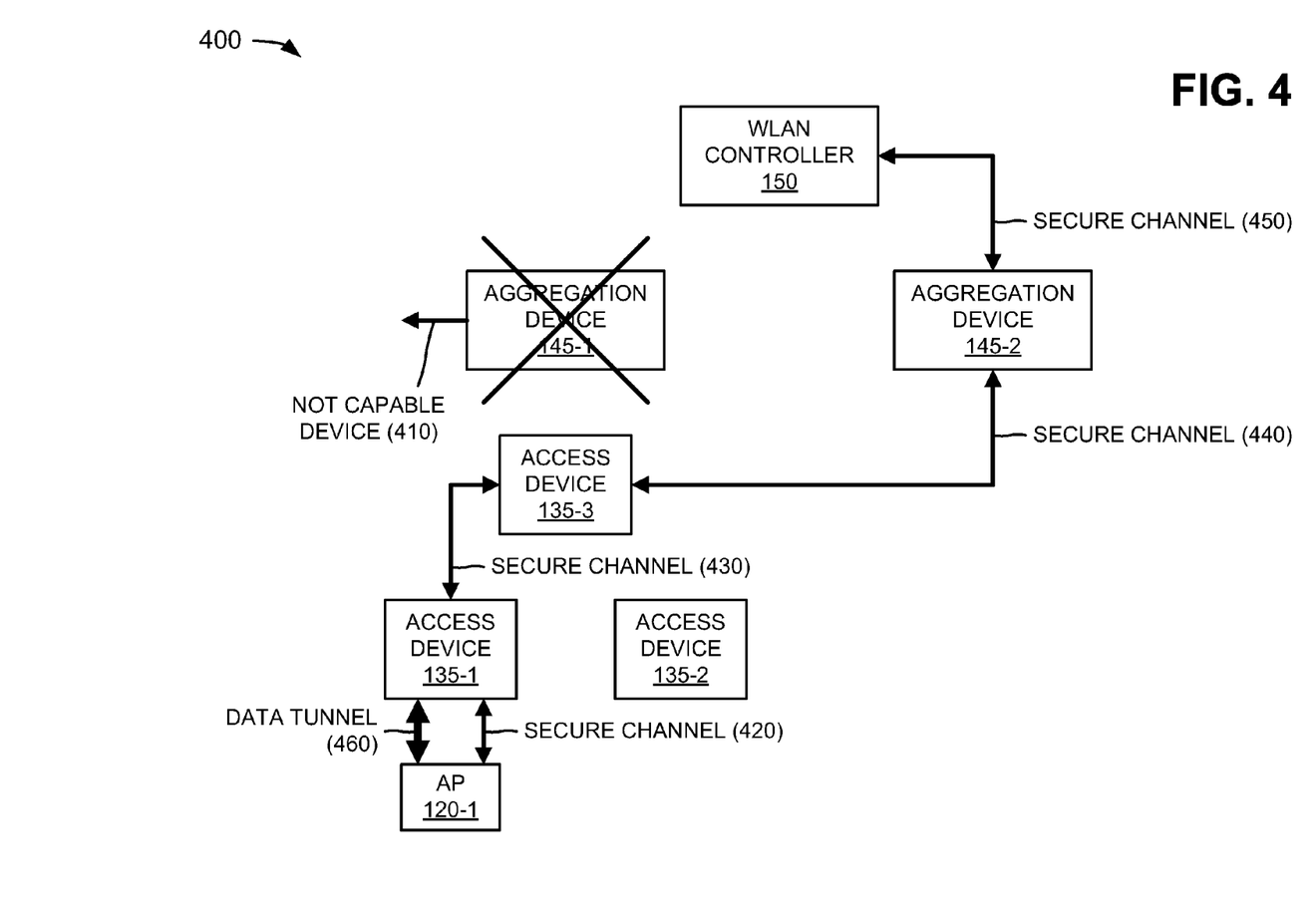
FIG. 4 is a diagram of example interactions between components of an example portion of the network depicted in FIG. 1.

FIG. 4 is a diagram of example interactions between components of an example portion 400 of network 100. As illustrated, example network portion 400 may include access point 120-1, access devices 135-1, 135-2, and 135-3, aggregation devices 145-1 and 145-2, and WLAN controller 150. Access point 120-1, access devices 135-1, 135-2, and 135-3, aggregation devices 145-1 and 145-2, and WLAN controller 150 may include the features described above in connection with, for example, one or more of FIGS. 1-3. In one implementation, network portion 400 may provide a centralized or a distributed WLAN architecture.

In one implementation, a protocol may be executed on all nodes (e.g., access point 120-1, access devices 135-1, 135-2, and 135-3, aggregation devices 145-1 and 145-2, WLAN controller 150) of network portion 400. In one example, the protocol may include an Intermediate System to Intermediate System (IS-IS) or an Open Shortest Path First (OSPF) type protocol that may determine a best route for traffic through network portion 400. The protocol may cause the nodes of network portion 400 to exchange capability information (e.g., when the protocol converges). The capability information may include, for example: a layout pattern of interconnections of various elements (e.g., links, nodes, etc.) of network portion 400 (e.g., obtained via a topology discovery method); hardware and software capabilities associated with the nodes (e.g., access point 120-1, access devices 135-1, 135-2, and 135-3, aggregation devices 145-1 and 145-2, and WLAN controller 150); whether the nodes can terminate tunnels to other nodes; whether the nodes can implement security methods (e.g., secure tunnels, encryption, etc.); whether the nodes can forward traffic to other nodes; etc.

In one example implementation, the capability information may indicate whether the nodes of network portion 400 are capable of implementing a MAC security standard (e.g., the MACSec standard set forth in IEEE 802.1ae) and a layer 2 link security standard (e.g., the KeySec standard set forth in IEEE 802.1af). The MACSec standard may define connectionless data confidentiality and integrity for media access independent protocols, and may define a format (e.g., data encapsulation, encryption, and authentication) for packets. The KeySec standard may be used to exchange encryption keys between the nodes of network portion 400, and may define a key management protocol for the MACSec standard (e.g., may define how MACSec endpoints exchange encryption keys). The MACSec and KeySec standards together may define a LinkSec standard that provides a layer 2 security protocol for the nodes of network portion 400. In one example, the layer 2 security protocol may be executed in a hop-by-hop manner (e.g., rather than an end-to-end manner) on the nodes of network portion 400. Execution of the layer 2 security protocol in this manner may provide low processing overhead for the nodes of network portion 400.

In one example implementation, the IS-IS or OSPF type protocol may execute on all nodes (e.g., access point 120-1, access devices 135-1, 135-2, and 135-3, aggregation devices 145-1 and 145-2, and WLAN controller 150) of a network (e.g., network portion 400). In another example implementation, if the capability information indicates that no nodes of network portion 400 are capable devices (e.g., capable of terminating tunnels, implementing security methods, forwarding traffic, etc.), network portion 400 may revert to a centralized WLAN architecture (e.g., if network portion 400 was a distributed WLAN architecture).

In one example, and with reference to FIG. 4, the capability information may indicate that aggregation device 145-1 is not a capable device, as indicated by reference number 410. Accordingly, aggregation device 145-1 may be excluded from consideration as a device to provide secure data and control traffic. Access point 120-1 may receive the capability information associated with a next hop device (e.g., access device 135-1), and may determine, based on the capability information, if access device 135-1 is capable of providing security (e.g., via the MACSec and KeySec standards). In this example, the capability information may indicate that access device 135-1 is capable of providing security. For example, the KeySec standard may create a certified authority (CA) using a MACSec key agreement associated with each of access point 120-1 and access device 135-1. Thus, access point 120-1 may create a secure channel 420 with access device 135-1 (e.g., for secure communications between access point 120-1 and access device 135-1), and may exchange keys with access device 135-1 via secure channel 420.

Access point 120-1 may receive a packet for forwarding to access device 135-1, and may determine if the packet is valid based on an integrity check. For example, access point 120-1 may determine an integrity check value (ICV) on the packet and may compare the determined ICV to an ICV included within the packet. If the ICVs match, the packet may be deemed valid. If the ICVs do not match, the packet may be deemed invalid. When the packet is valid, access point 120-1 encrypt the packet with a key received from access device 135-1, and may forward the valid encrypted packet to access device 135-1. When the packet is invalid, access point 120-1 may handle the invalid packet according to a preset policy (e.g., access point 120-1 may discard the invalid packet).

As further shown in FIG. 4, access device 135-1 may create a secure channel 430 with access device 135-3 in a similar manner as described above for access point 120-1 and access device 135-1. Access device 135-1 may also process packets (e.g., for forwarding to access device 135-3) in a similar manner as described above for access point 120-1. Access device 135-3 may create a secure channel 440 with aggregation device 145-2 in a similar manner as described above for access point 120-1 and access device 135-1. Access device 135-3 may also process packets (e.g., for forwarding to aggregation device 145-2) in a similar manner as described above for access point 120-1. As further shown in FIG. 4, aggregation device 145-2 may create a secure channel 450 with WLAN controller 150 in a similar manner as described above for access point 120-1 and access device 135-1. Aggregation device 145-2 may also process packets (e.g., for forwarding to WLAN controller 150) in a similar manner as described above for access point 120-1.

Secure channels 420-450 may define a secure path (e.g., that includes MACSec and KeySec enabled devices) through network portion 400. Access point 120-1 may securely exchange packets with one or more of access device 135-1, access device 135-3, aggregation device 145-2, and WLAN controller 150 via secure channels 420-450. For example, as shown in FIG. 4, a data tunnel 460 may be created between access point 120-1 and access device 135-1 via secure channel 420. Data tunnel 460 may enable access point 120-1 and access device 135-1 to securely exchange data traffic (e.g., packets). Although not shown in FIG. 4, in one example implementation, secure channels 420-450 may be used to create secure control tunnels (e.g., for control traffic) between one or more of access point 120-1, access device 135-1, access device 135-3, aggregation device 145-2, and WLAN controller 150. Such an arrangement may enable WLAN architectures (e.g., network portion 400) to deploy secure data and control tunnels. Since the security provided by such an arrangement may be at the MAC level, there need not be any further change in the rest of a forwarding data path or control path.

Although FIG. 4 shows example components of network portion 400, in other implementations, network portion 400 may include fewer components, different components, differently arranged components, or additional components than depicted in FIG. 4. Alternatively, or additionally, one or more components of network portion 400 may perform one or more other tasks described as being performed by one or more other components of network portion 400.

Figure 5:
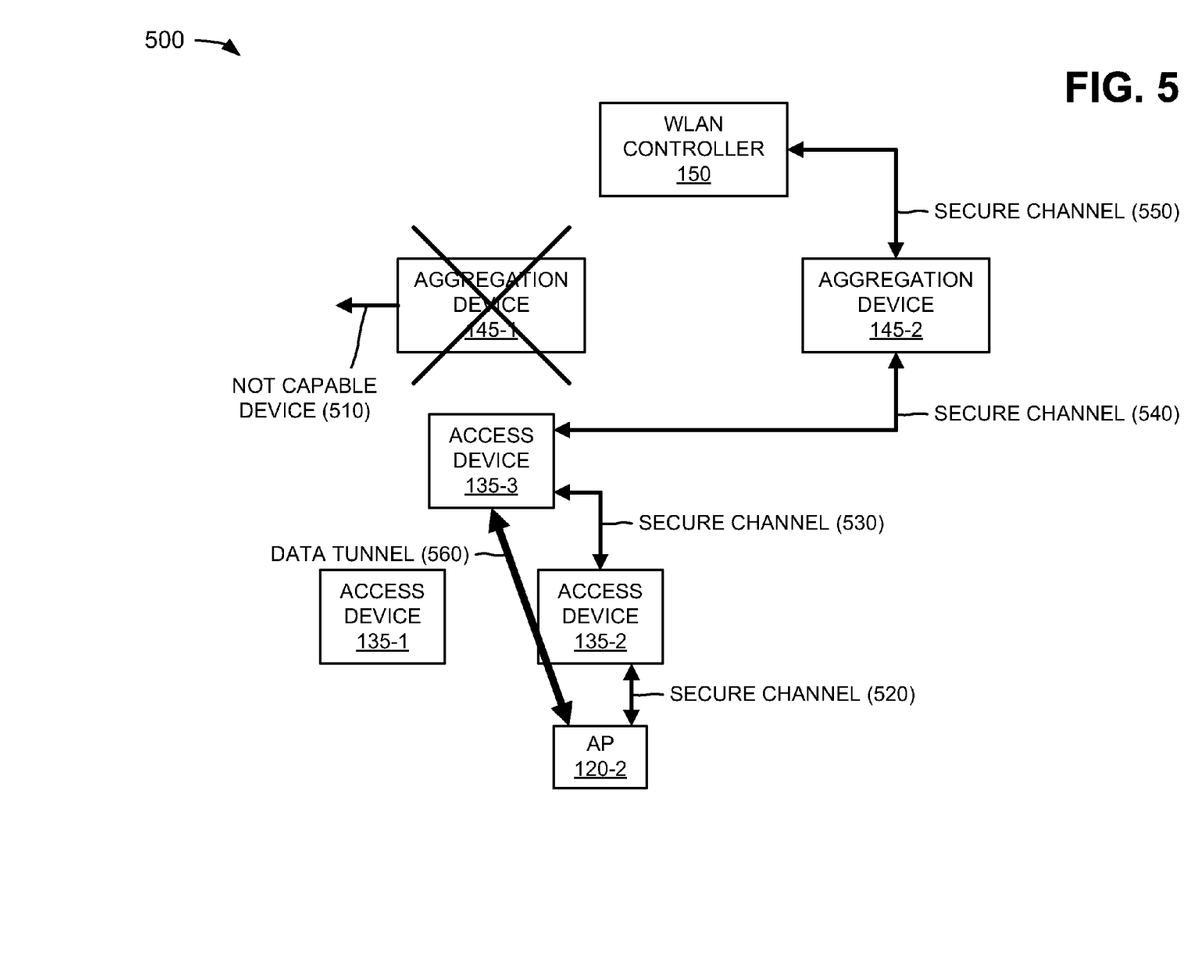
FIG. 5 is a diagram of example interactions between components of another example portion of the network depicted in FIG. 1.

FIG. 5 is a diagram of example interactions between components of another example portion 500 of network 100. As illustrated, example network portion 500 may include access point 120-2, access devices 135-1, 135-2, and 135-3, aggregation devices 145-1 and 145-2, and WLAN controller 150. Access point 120-2, access devices 135-1, 135-2, and 135-3, aggregation devices 145-1 and 145-2, and WLAN controller 150 may include the features described above in connection with, for example, one or more of FIGS. 1-4.

In one implementation, the IS-IS or OSPF type protocol may be executed on all nodes (e.g., access point 120-2, access devices 135-1, 135-2, and 135-3, aggregation devices 145-1 and 145-2, and WLAN controller 150) of network portion 500, and may cause the nodes of network portion 500 to exchange capability information (e.g., when the protocol converges). The capability information may indicate whether the nodes of network portion 500 are capable of implementing the MACSec and KeySec standards (e.g., which may define a LinkSec standard that provides a layer 2 security protocol for the nodes). In one example, the layer 2 security protocol may be executed in a hop-by-hop manner (e.g., rather than an end-to-end manner) on the nodes of network portion 500. Execution of the layer 2 security protocol in this manner may provide low processing overhead for the nodes of network portion 500.

In one example implementation, the IS-IS or OSPF type protocol may execute on all nodes (e.g., access point 120-1, access devices 135-1, 135-2, and 135-3, aggregation devices 145-1 and 145-2, and WLAN controller 150) of a network (e.g., network portion 500). In another example implementation, if the capability information indicates that no nodes of network portion 500 are capable devices (e.g., capable of terminating tunnels, implementing security methods, forwarding traffic, etc.), network portion 500 may revert to a centralized WLAN architecture (e.g., if network portion 500 was a distributed WLAN architecture).

In one example, and with reference to FIG. 5, the capability information may indicate that aggregation device 145-1 is not a capable device, as indicated by reference number 510. Accordingly, aggregation device 145-1 may be excluded from consideration as a device to provide secure data and control traffic. Access point 120-2 may receive the capability information associated with a next hop device (e.g., access device 135-2), and may determine, based on the capability information, if access device 135-2 is capable of providing security (e.g., via the MACSec and KeySec standards). In this example, the capability information may indicate that access device 135-2 is capable of providing security. Thus, access point 120-2 may create a secure channel 520 with access device 135-2 (e.g., for secure communications between access point 120-2 and access device 135-2), and may exchange keys with access device 135-2 via secure channel 520.

Access point 120-2 may receive a packet for forwarding to access device 135-2, and may determine if the packet is valid based on an integrity check. When the packet is valid, access point 120-2 may encrypt the packet with a key received from access device 135-2, and may forward the valid encrypted packet to access device 135-2. When the packet is invalid, access point 120-2 may handle the invalid packet according to a preset policy (e.g., access point 120-2 may discard the invalid packet).

As further shown in FIG. 5, access device 135-2 may create a secure channel 530 with access device 135-3 in a similar manner as described above for access point 120-2 and access device 135-2. Access device 135-2 may also process packets (e.g., for forwarding to access device 135-3) in a similar manner as described above for access point 120-2. Access device 135-3 may create a secure channel 540 with aggregation device 145-2 in a similar manner as described above for access point 120-2 and access device 135-2. Access device 135-3 may also process packets (e.g., for forwarding to aggregation device 145-2) in a similar manner as described above for access point 120-2. As further shown in FIG. 5, aggregation device 145-2 may create a secure channel 550 with WLAN controller 150 in a similar manner as described above for access point 120-2 and access device 135-2. Aggregation device 145-2 may also process packets (e.g., for forwarding to WLAN controller 150) in a similar manner as described above for access point 120-2.

Secure channels 520-550 may define a secure path (e.g., that includes MACSec and KeySec enabled devices) through network portion 500. Access point 120-2 may securely exchange packets with one or more of access device 135-2, access device 135-3, aggregation device 145-2, and WLAN controller 150 via secure channels 520-550. For example, as shown in FIG. 5, a data tunnel 560 may be created between access point 120-2 and access device 135-3 via secure channels 520 and 530. Data tunnel 560 may enable access point 120-2 and access device 135-3 to securely exchange data traffic (e.g., packets). Although not shown in FIG. 5, in one example implementation, secure channels 520-550 may be used to create secure control tunnels (e.g., for control traffic) between one or more of access point 120-2, access device 135-2, access device 135-3, aggregation device 145-2, and WLAN controller 150. Such an arrangement may enable WLAN architectures (e.g., network portion 500) to deploy secure data and control tunnels. Since the security provided by such an arrangement may be at the MAC level, there need not be any further change in the rest of a forwarding data path or control path.

Although FIG. 5 shows example components of network portion 500, in other implementations, network portion 500 may include fewer components, different components, differently arranged components, or additional components than depicted in FIG. 5. Alternatively, or additionally, one or more components of network portion 500 may perform one or more other tasks described as being performed by one or more other components of network portion 500.

Figure 6:
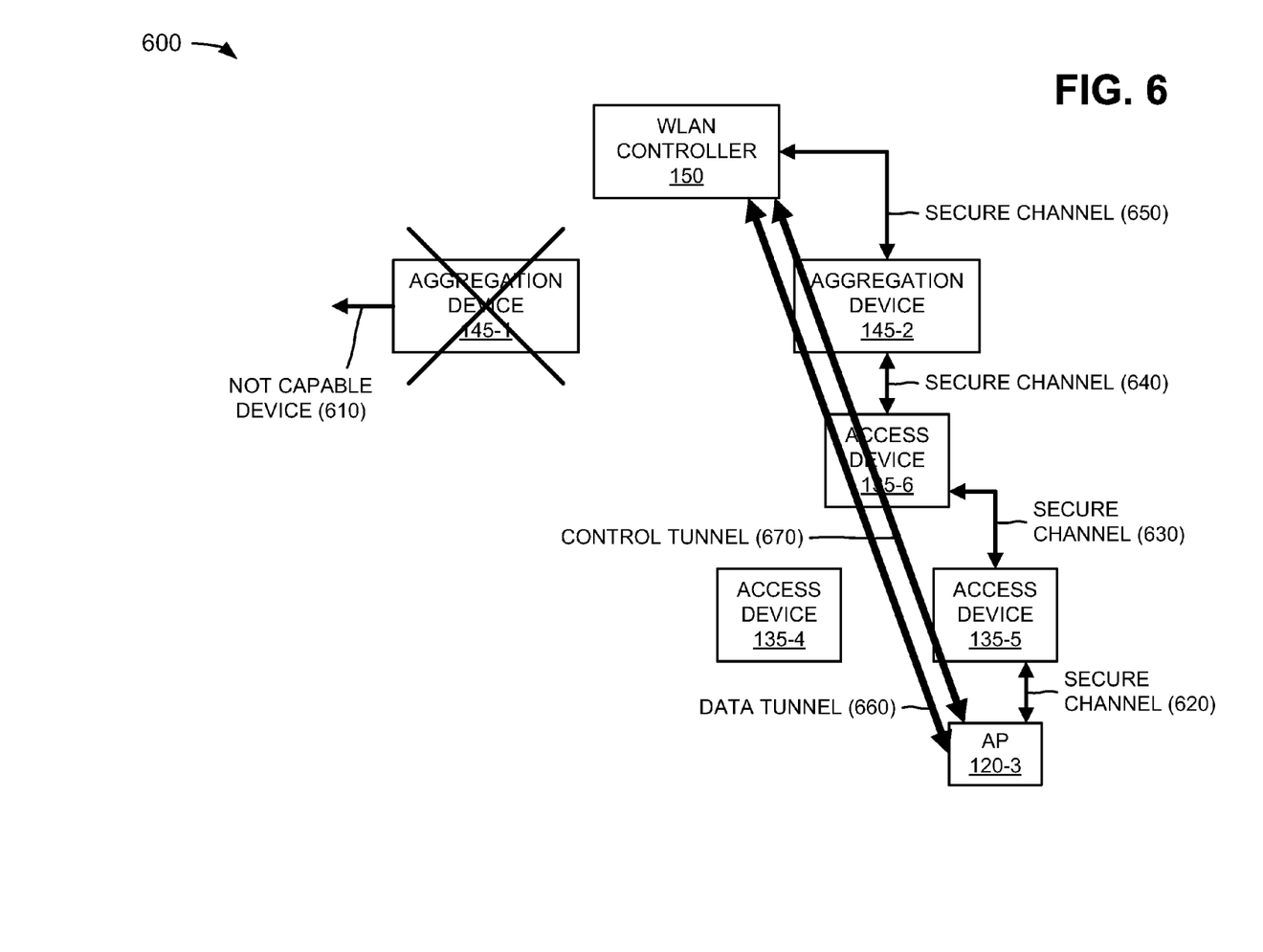
FIG. 6 is a diagram of example interactions between components of still another example portion of the network depicted in FIG. 1.

FIG. 6 is a diagram of example interactions between components of still another example portion 600 of network 100. As illustrated, example network portion 600 may include access point 120-3, access devices 135-4, 135-5, and 135-6, aggregation devices 145-1 and 145-2, and WLAN controller 150. Access point 120-3, access devices 135-4, 135-5, and 135-6, aggregation devices 145-1 and 145-2, and WLAN controller 150 may include the features described above in connection with, for example, one or more of FIGS. 1-5.

In one implementation, the IS-IS or OSPF type protocol may be executed on all nodes (e.g., access point 120-3, access devices 135-4, 135-5, and 135-6, aggregation devices 145-1 and 145-2, and WLAN controller 150) of network portion 600, and may cause the nodes of network portion 600 to exchange capability information (e.g., when the protocol converges). The capability information may indicate whether the nodes of network portion 600 are capable of implementing the MACSec and KeySec standards (e.g., which may define a LinkSec standard that provides a layer 2 security protocol for the nodes). In one example, the layer 2 security protocol may be executed in a hop-by-hop manner (e.g., rather than an end-to-end manner) on the nodes of network portion 600. Execution of the layer 2 security protocol in this manner may provide low processing overhead for the nodes of network portion 600.

In one example implementation, the IS-IS or OSPF type protocol may execute on all nodes (e.g., access point 120-3, access devices 135-4, 135-5, and 135-6, aggregation devices 145-1 and 145-2, and WLAN controller 150) of a network (e.g., network portion 600). In another example implementation, if the capability information indicates that no nodes of network portion 600 are capable devices (e.g., capable of terminating tunnels, implementing security methods, forwarding traffic, etc.), network portion 600 may revert to a centralized WLAN architecture (e.g., if network portion 600 was a distributed WLAN architecture).

In one example, and with reference to FIG. 6, the capability information may indicate that aggregation device 145-1 is not a capable device, as indicated by reference number 610. Accordingly, aggregation device 145-1 may be excluded from consideration as a device to provide secure data and control traffic. Access point 120-3 may receive the capability information associated with a next hop device (e.g., access device 135-5), and may determine, based on the capability information, if access device 135-5 is capable of providing security (e.g., via the MACSec and KeySec standards). In this example, the capability information may indicate that access device 135-5 is capable of providing security. Thus, access point 120-3 may create a secure channel 620 with access device 135-5 (e.g., for secure communications between access point 120-3 and access device 135-5), and may exchange keys with access device 135-5 via secure channel 620.

Access point 120-3 may receive a packet for forwarding to access device 135-5, and may determine if the packet is valid based on an integrity check. When the packet is valid, access point 120-3 may encrypt the packet with a key received from access device 135-5, and may forward the valid encrypted packet to access device 135-5. When the packet is invalid, access point 120-3 may handle the invalid packet according to a preset policy (e.g., access point 120-3 may discard the invalid packet).

As further shown in FIG. 6, access device 135-5 may create a secure channel 630 with access device 135-6 in a similar manner as described above for access point 120-3 and access device 135-5. Access device 135-5 may also process packets (e.g., for forwarding to access device 135-6) in a similar manner as described above for access point 120-3. Access device 135-6 may create a secure channel 640 with aggregation device 145-2 in a similar manner as described above for access point 120-3 and access device 135-5. Access device 135-6 may also process packets (e.g., for forwarding to aggregation device 145-2) in a similar manner as described above for access point 120-3. As further shown in FIG. 6, aggregation device 145-2 may create a secure channel 650 with WLAN controller 150 in a similar manner as described above for access point 120-3 and access device 135-5. Aggregation device 145-2 may also process packets (e.g., for forwarding to WLAN controller 150) in a similar manner as described above for access point 120-3.

Secure channels 620-650 may define a secure path (e.g., that includes MACSec and KeySec enabled devices) through network portion 600. Access point 120-3 may securely exchange packets with one or more of access device 135-5, access device 135-6, aggregation device 145-2, and WLAN controller 150 via secure channels 620-650. For example, as shown in FIG. 6, a data tunnel 660 may be created between access point 120-3 and WLAN controller 150 via secure channels 620-650. Data tunnel 660 may enable access point 120-3 and WLAN controller 150 to securely exchange data traffic (e.g., packets). In one example implementation, secure channels 620-650 may be used to create secure control tunnels (e.g., for control traffic) between one or more of access point 120-3, access device 135-5, access device 135-6, aggregation device 145-2, and WLAN controller 150. For example, as shown in FIG. 6, a control tunnel 670 may be created between access point 120-3 and WLAN controller 150 via secure channels 620-650. Control tunnel 670 may enable access point 120-3 and WLAN controller 150 to securely exchange control traffic (e.g., packets). Such an arrangement may enable WLAN architectures (e.g., network portion 600) to deploy secure data and control tunnels. Since the security provided by such an arrangement may be at the MAC level, there need not be any further change in the rest of a forwarding data path or control path.

Although FIG. 6 shows example components of network portion 600, in other implementations, network portion 600 may include fewer components, different components, differently arranged components, or additional components than depicted in FIG. 6. Alternatively, or additionally, one or more components of network portion 600 may perform one or more other tasks described as being performed by one or more other components of network portion 600.

Figure 7:
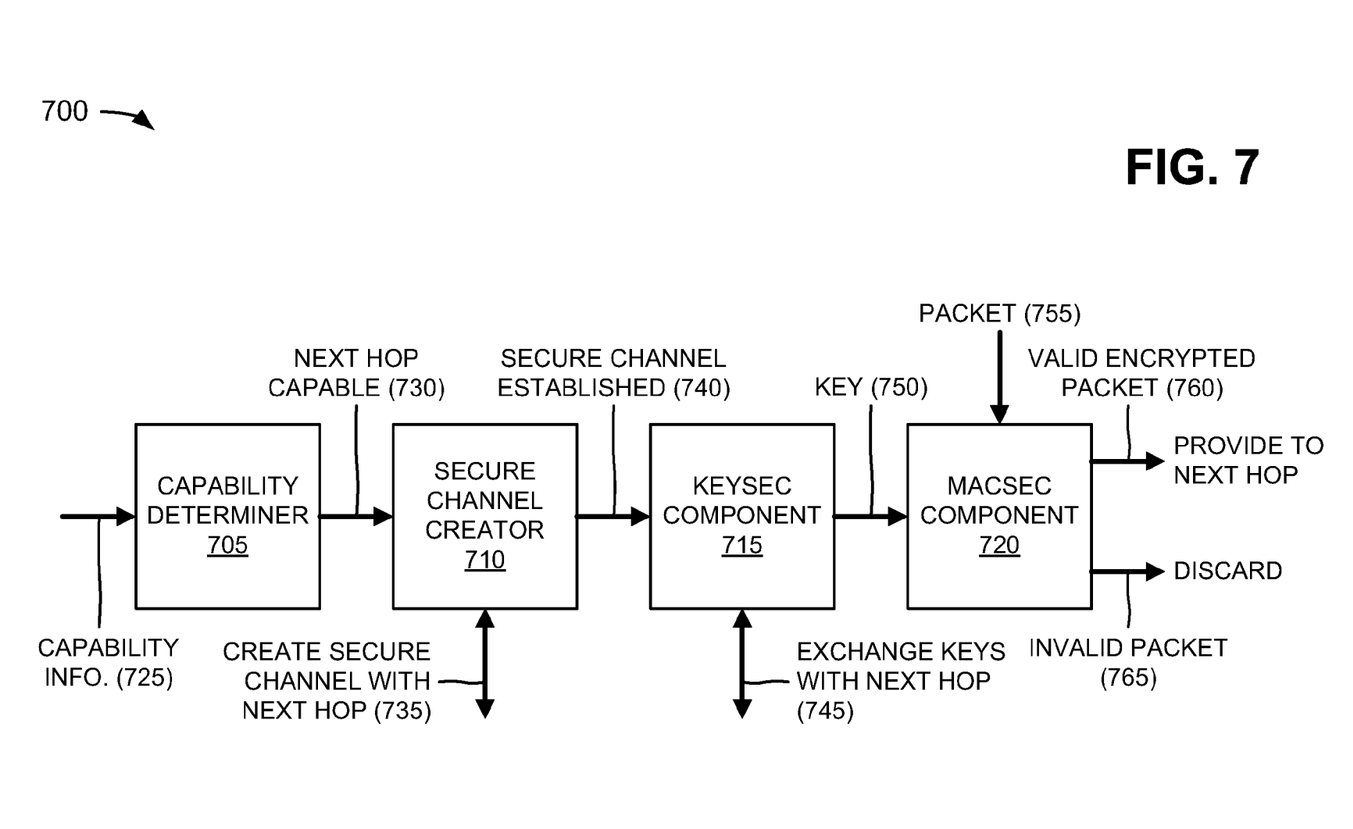
FIG. 7 is a diagram of example functional components of an access point, an access device, an aggregation device, or the WLAN controller illustrated in FIG. 1.

FIG. 7 is a diagram of example functional components of a device 700 that may correspond to access point 120, access device 135, aggregation device 145, or WLAN controller 150. In one implementation, the functions described in connection with FIG. 7 may be performed by one or more components of device 200 (FIG. 2) or device 300 (FIG. 3). As illustrated in FIG. 7, device 700 may include a capability determiner 705, a secure channel creator 710, a KeySec component 715, and a MACSec component 720.

Capability determiner 705 may include hardware or a combination of hardware and software that may receive capability information 725 from the nodes (e.g., access points 120, access devices 135, aggregation devices 145, and WLAN controller 150) of network 100. Capability information 725 may include, for example: a layout pattern of interconnections of various elements (e.g., links, nodes, etc.) of network 100 (e.g., obtained via a topology discovery method); hardware and software capabilities associated with the nodes of network 100; whether the nodes of network 100 can terminate tunnels to other nodes; whether the nodes of network 100 can implement security methods (e.g., secure tunnels, encryption, etc.); whether the nodes of network 100 can forward traffic to other nodes; etc. In one example implementation, capability information 725 may indicate whether the nodes of network 100 are capable of implementing a MAC security standard (e.g., the MACSec standard) and a layer 2 link security standard (e.g., the KeySec standard). Capability determiner 705 may determine, based on capability information 725, if a next hop device is capable of providing security (e.g., via the MACSec and KeySec standards). In this example, capability information 725 may indicate that the next hop device is capable of providing security, and capability determiner 705 may provide an indication 730 (e.g., that the next hop device is capable) to secure channel creator 710.

Secure channel creator 710 may include hardware or a combination of hardware and software that may receive indication 730 from capability determiner 705, and may create (e.g., based on indication 730) a secure channel with the next hop device, as indicated by reference number 735. As further shown in FIG. 7, once the secure channel is created with the next hop device, secure channel creator 710 may provide an indication 740 (e.g., that the secure channel is established with the next hop device) to KeySec component 715.

KeySec component 715 may include hardware or a combination of hardware and software that may receive indication 740 from secure channel creator 710, and may exchange (e.g., based on indication 740) keys with the next hop device, as indicated by reference number 745. As further shown in FIG. 7, KeySec component 715 may receive a key 750 from the next hop device, and may provide key 750 to MACSec component 720.

MACSec component 720 may include hardware or a combination of hardware and software that may receive key 750 from KeySec component 715, and may receive a packet 755 for forwarding to the next hop device. MACSec component 720 may determine if packet 755 is valid based on an integrity check (e.g., an ICV integrity check). When packet 755 is valid, MACSec component 720 may encrypt packet 755 with key 750 (e.g., to create valid encrypted packet 760), and may forward valid encrypted packet 760 to the next hop device. When packet 755 is invalid (e.g., as indicated by reference number 765), MACSec component 720 may handle invalid packet 765 according to a preset policy (e.g., MACSec component 720 may discard invalid packet 765).

Although FIG. 7 shows example functional components of device 700, in other implementations, device 700 may include fewer functional components, different functional components, differently arranged functional components, or additional functional components than depicted in FIG. 7. Alternatively, or additionally, one or more functional components of device 700 may perform one or more other tasks described as being performed by one or more other functional components of device 700.

Figure 8A:
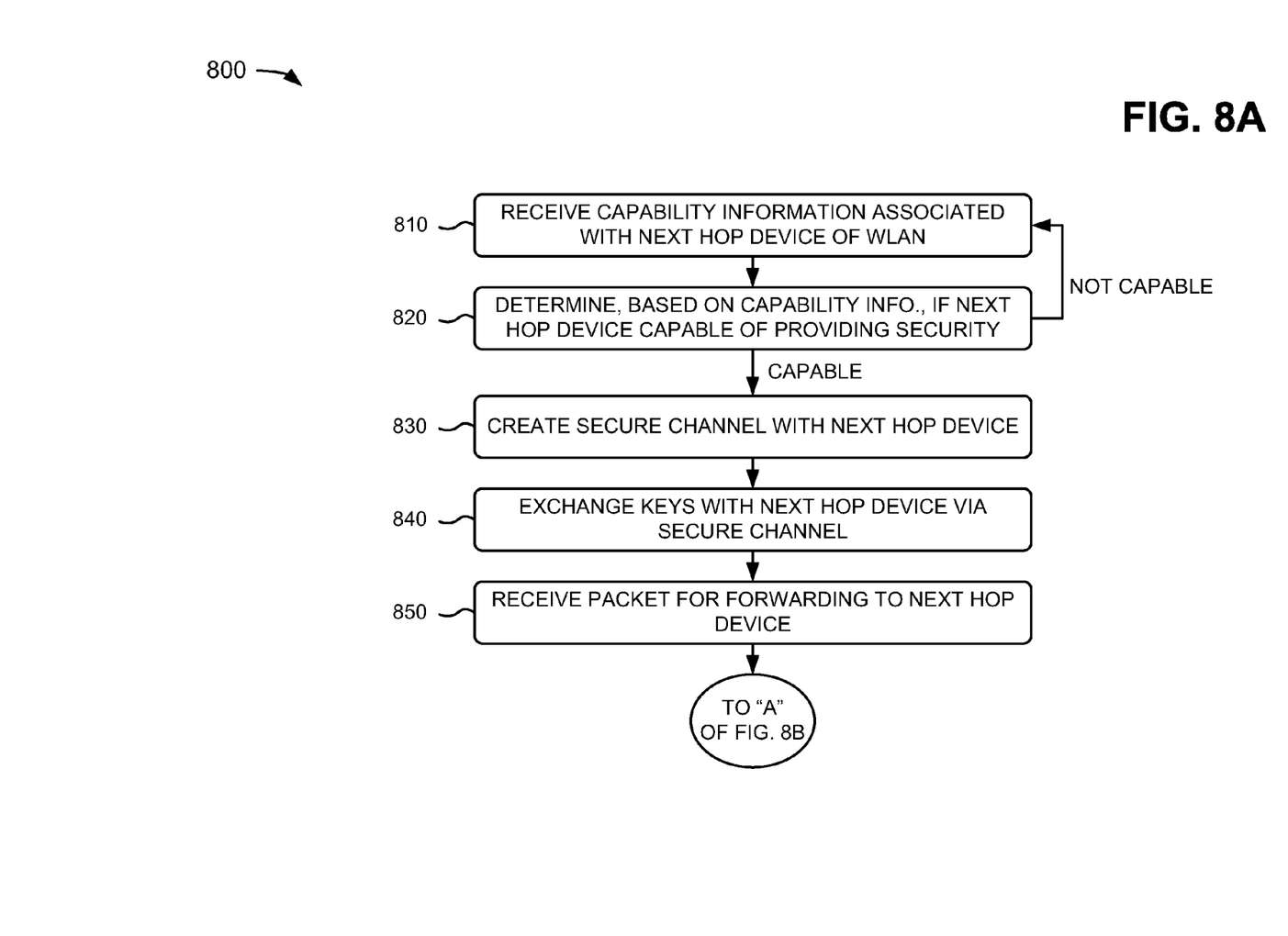
FIGS. 8A and 8B are flow charts of an example process for providing a secure WLAN for data and control traffic according to implementations described herein.
Figure 8B:
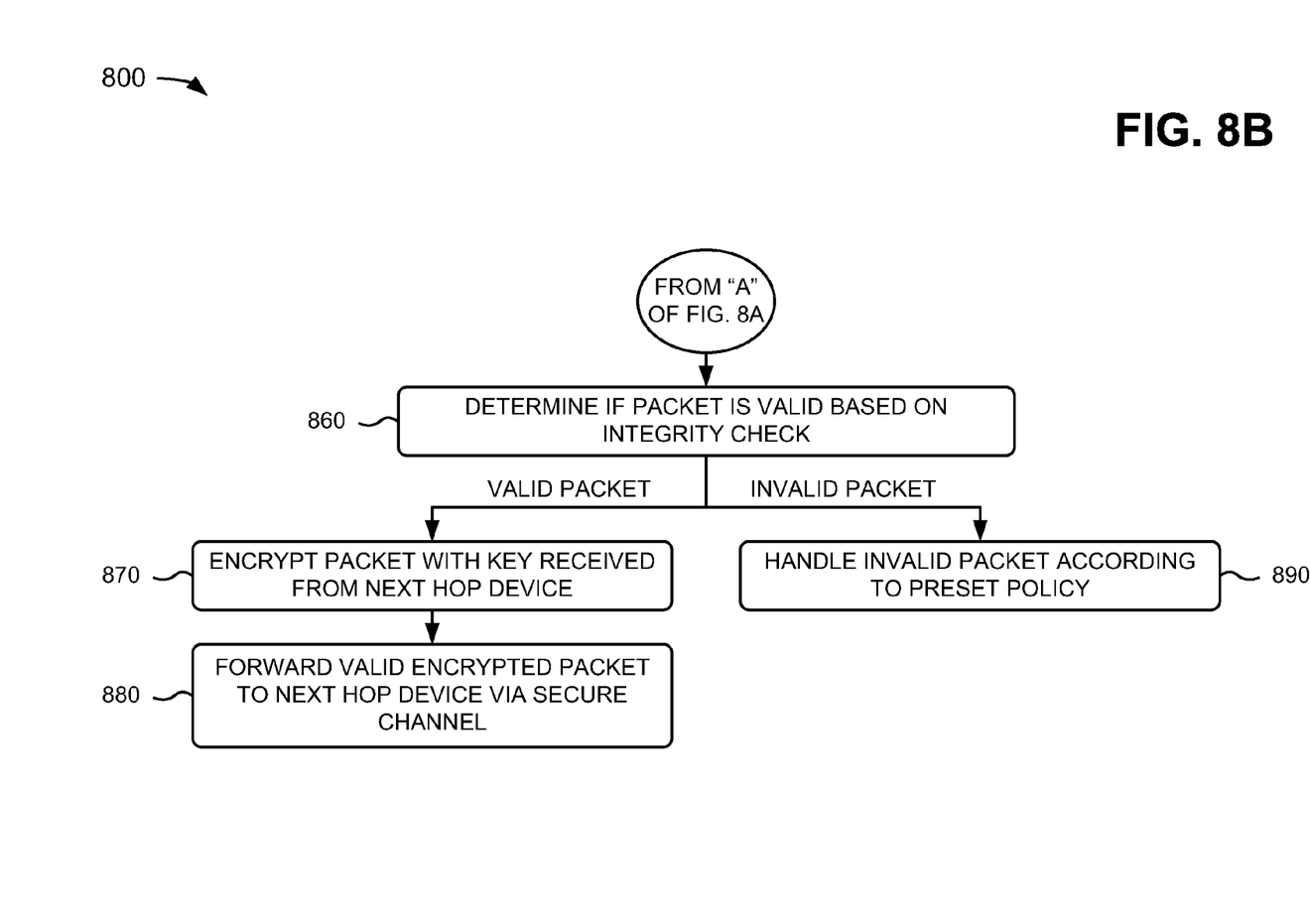

FIGS. 8A and 8B are flow charts of an example process 800 for providing a secure WLAN for data and control traffic according to implementations described herein. In one implementation, process 800 may be performed by one of access points 120, access devices 135, aggregation devices 145, or WLAN controller 150. In another implementation, some or all of process 800 may be performed by another device in conjunction with one of access points 120, access devices 135, aggregation devices 145, or WLAN controller 150.

As illustrated in FIG. 8A, process 800 may include receiving capability information associated with a next hop device of a WLAN (block 810), and determining, based on the capability information, whether the next hop device is capable of providing security (block 820). If the next hop device is not capable of providing security (block 820—NOT CAPABLE), process 800 may include receiving capability information associated with another next hop device of the WLAN (block 810). For example, in implementations described above in connection with FIG. 4, a protocol may be executed on all nodes of network portion 400. The protocol may cause the nodes of network portion 400 to exchange capability information (e.g., when the protocol converges). The capability information may indicate whether the nodes of network portion 400 are capable of implementing a MAC security standard (e.g., the MACSec standard) and a layer 2 link security standard (e.g., the KeySec standard). In one example, the capability information may indicate that aggregation device 145-1 is not a capable device. Accordingly, aggregation device 145-1 may be excluded from consideration as a device to provide secure data and control traffic. Access point 120-1 may receive the capability information associated with a next hop device (e.g., access device 135-1), and may determine, based on the capability information, if access device 135-1 is capable of providing security (e.g., via the MACSec and KeySec standards).

As further shown in FIG. 8A, if the next hop device is capable of providing security (block 820—CAPABLE), process 800 may include creating a secure channel with the next hop device (block 830), exchanging keys with the next hop device via the secure channel (block 840), and receiving a packet for forwarding to the next hop device (block 850). For example, in implementations described above in connection with FIG. 4, the capability information may indicate that access device 135-1 is capable of providing security. In one example, the KeySec standard may create a CA using a MACSec key agreement associated with each of access point 120-1 and access device 135-1. Thus, access point 120-1 may create secure channel 420 with access device 135-1 (e.g., for secure communications between access point 120-1 and access device 135-1), and may exchange keys with access device 135-1 via secure channel 420. Access point 120-1 may receive a packet for forwarding to access device 135-1.

As shown in FIG. 8B, process 800 may include determining if the packet is valid based on an integrity check (block 860). For example, in implementations described above in connection with FIG. 4, access point 120-1 may determine if the packet is valid based on an integrity check. In one example, access point 120-1 may determine an ICV on the packet and may compare the determined ICV to an ICV included within the packet.

As further shown in FIG. 8B, if the packet is valid (block 860—VALID PACKET), process 800 may include encrypting the packet with a key received from the next hop device (block 870), and forwarding the valid encrypted packet to the next hop device via the secure channel (block 880). If the packet is invalid (block 860—INVALID PACKET), process 800 may include handling the invalid packet according to a preset policy (block 890). For example, in implementations described above in connection with FIG. 4, if the ICVs match (e.g., pursuant to the integrity check), the packet may be deemed valid. If the ICVs do not match (e.g., pursuant to the integrity check), the packet may be deemed invalid. When the packet is valid, access point 120-1 may encrypt the packet with a key received from access device 135-1, and may forward the valid encrypted packet to access device 135-1. When the packet is invalid, access point 120-1 may handle the invalid packet according to a preset policy (e.g., access point 120-1 may discard the invalid packet).

Systems and/or methods described herein may provide a secure WLAN for data and control traffic. For example, the systems and/or methods may utilize a MAC security standard (e.g., the MACSec standard set forth in IEEE 802.1ae) along with a layer 2 link security standard (e.g., the KeySec standard set forth in IEEE 802.1af) to provide a secure data tunnel from an access point to other WLAN devices (e.g., access devices, aggregation devices, etc.). The systems and/or methods may also utilize the MAC security standard and the layer 2 link security standard to provide a secure control tunnel from an access point to other WLAN devices. The systems and/or methods may be implemented in existing WLAN architectures, and may not require enhanced forwarding chips and new board layouts in the access point and the other WLAN devices.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIGS. 8A and 8B, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
  receiving, by a computing device, capability information associated with a next hop device of a wireless local area network (WLAN);
  determining, by the computing device and based on the capability information, that the next hop device is capable of implementing a media access control (MAC) security standard and a layer 2 link security standard;
  creating, by the computing device and via the MAC security standard, a secure channel with the next hop device after determining that the next hop device is capable of implementing the MAC security standard and the layer 2 link security standard; and
  transmitting, by the computing device and after creating the secure channel, an encrypted packet to the next hop device via the secure channel.

2. The method of claim 1, where the MAC security standard includes a MACSec standard set forth in IEEE 802.1ae.

3. The method of claim 1, where the layer 2 link security standard includes a standard for exchanging encryption keys.

4. The method of claim 1, further comprising:
  receiving, via the secure channel and from the next hope device, a key that is to be used for encryption;
  receiving a packet; and
  encrypting the packet by using the key to obtain the encrypted packet.

5. The method of claim 1, further comprising:
  determining whether a packet is valid based on an integrity check;
  encrypting the packet to obtain another encrypted packet when the packet is valid;
  forwarding the other encrypted packet to the next hop device when the packet is valid; and
  handling the packet according to a preset policy when the packet is invalid.

6. The method of claim 5, where determining whether the packet is valid based on the integrity check includes:
  determining a determined integrity check value (ICV) for the packet,
  determining whether the determined ICV matches an ICV included within the packet,
  determining that the packet is valid when the determined ICV matches the ICV included within the packet, and
  determining that the packet is invalid when the determined ICV does not match the ICV included within the packet.

7. The method of claim 5, where handling the packet according to the preset policy includes:
  discarding the packet.

8. The method of claim 1, where each of the computing device and the next hop device includes one of:
  an access point, an access device provided in an access network of the WLAN, an aggregation device provided in an aggregation network of the WLAN, or a WLAN controller.

9. The method of claim 1,
where the secure channel includes one of:
- a secure data traffic tunnel that is to be used to securely exchange data traffic between the computing device and the next hop device, or
- a secure control traffic tunnel that is to be used to securely exchange control traffic between the computing device and the next hop device, and where the packet includes one of the data traffic or the control traffic.

10. A device comprising:
a memory to store a plurality of instructions; and
a processor to execute one or more of the plurality of the instructions to:
- receive capability information associated with a next hop device of a wireless local area network (WLAN),
- determine, based on the capability information, that the next hop device is capable of implementing a media access control (MAC) security standard and a layer 2 link security standard,
- create, via the MAC security standard, a secure channel with the next hop device after determining that the next hop device is capable of implementing the MAC security standard and the layer 2 link security standard, and
- transmit, to the next hop device and via the secure channel, an encrypted packet after creating the secure channel.

11. The device of claim 10, where each of the device and the next hop device includes one of:
an access point,
an access device provided in an access network of the WLAN,
an aggregation device provided in an aggregation network of the WLAN, or
a WLAN controller.

12. The device of claim 10,
where the secure channel enables the device and the next hop device to securely exchange data traffic or control traffic, and
where the packet includes one of the data traffic or the control traffic.

13. The device of claim 10, where the MAC security standard includes a MACSec standard set forth in IEEE 802.1ae.

14. The device of claim 10, where the layer 2 link security standard includes a standard for exchanging encryption keys.

15. The device of claim 10, where the processor is further to execute the one or more of the plurality of instructions to:
receive, via the secure channel, a key from the next hop device,
receive a packet, and
encrypt the packet by using the key to obtain the encrypted packet.

16. The device of claim 10, where the processor is further to execute the one or more of the plurality of instructions to:
determine whether a packet is valid based on an integrity check,
encrypt the packet to obtain another encrypted packet when the packet is valid,
forward the other encrypted packet to the next hop device when the packet is valid, and
handle the packet based on a preset policy when the packet is invalid.

17. The device of claim 16, where, when determining whether the packet is valid based on the integrity check, the processor is to:
determine a determined integrity check value (ICV) for the packet,
determine whether the determined ICV matches an ICV included within the packet,
determine that the packet is valid when the determined ICV matches the ICV included within the packet, and
determine that the packet is invalid when the determined ICV does not match the ICV included within the packet.

18. The method of claim 16, where, when handling the packet based on the preset policy, the processor is to:
discard the packet.

19. A non-transitory computer-readable medium storing instructions, the instructions comprising:
one or more instructions that, when executed by at least one processor, cause the at least one processor to:
- receive capability information associated with a next hop device of a wireless local area network (WLAN);
- determine, based on the capability information, whether the next hop device is capable of implementing a media access control (MAC) security standard and a layer 2 link security standard;
- create, via the MAC security standard, a secure channel with the next hop device after determining that the next hop device is capable of implementing the MAC security standard and the layer 2 link security standard; and
- transmit, to the next hop device and via the secure channel, an encrypted packet after creating the secure channel.

20. The non-transitory computer-readable medium of claim 19, where the instructions further comprise:
one or more instructions that, when executed by the at least one processor, cause the at least one processor to:
- receive, via the secure channel, a key from the next hop device;
- receive a packet;
- determine that the packet is valid based on an integrity check; and
- encrypt the packet with the key to obtain the encrypted packet after determining that the packet is valid.

* * * * *